UNITED STATES PATENT OFFICE.

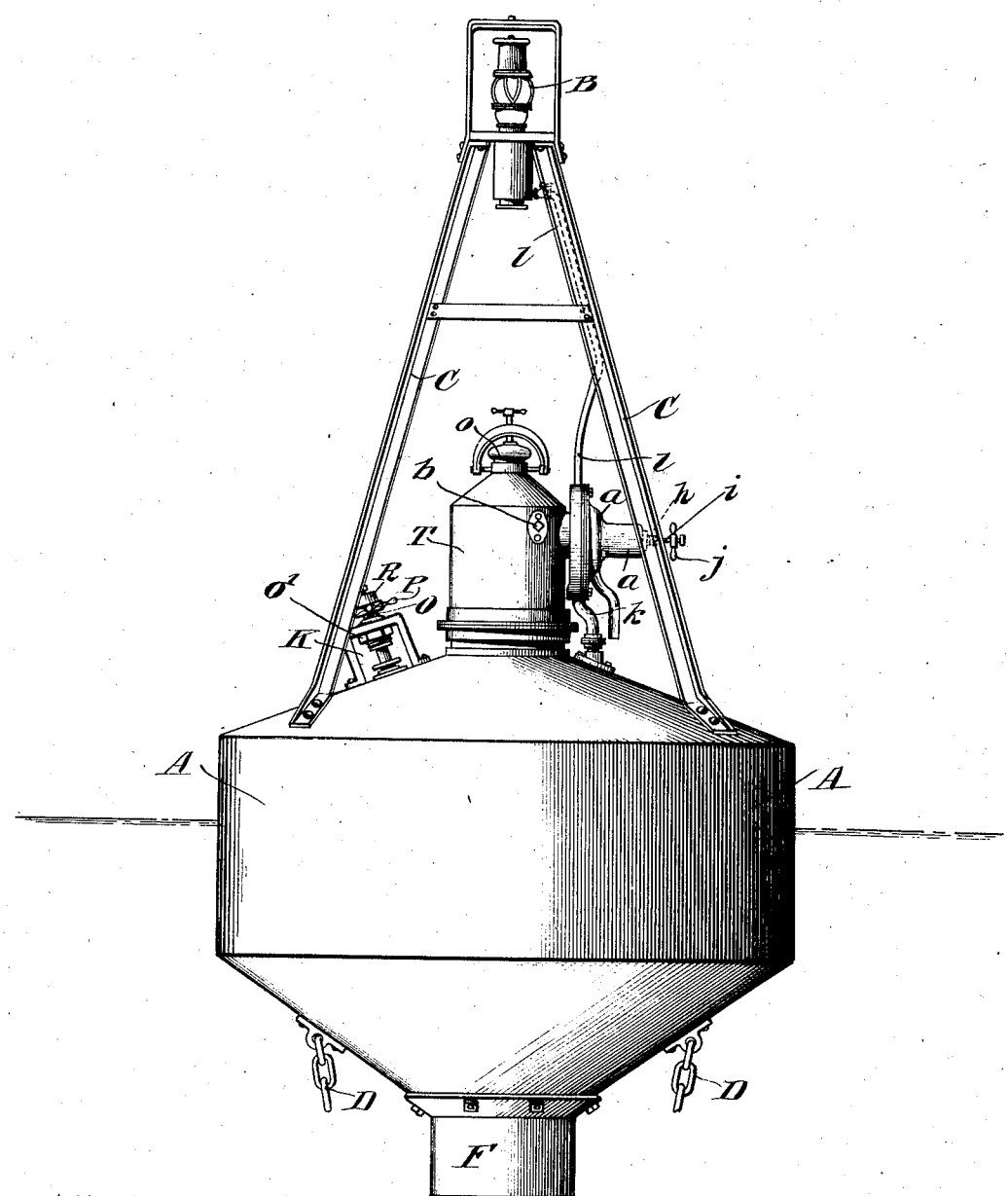

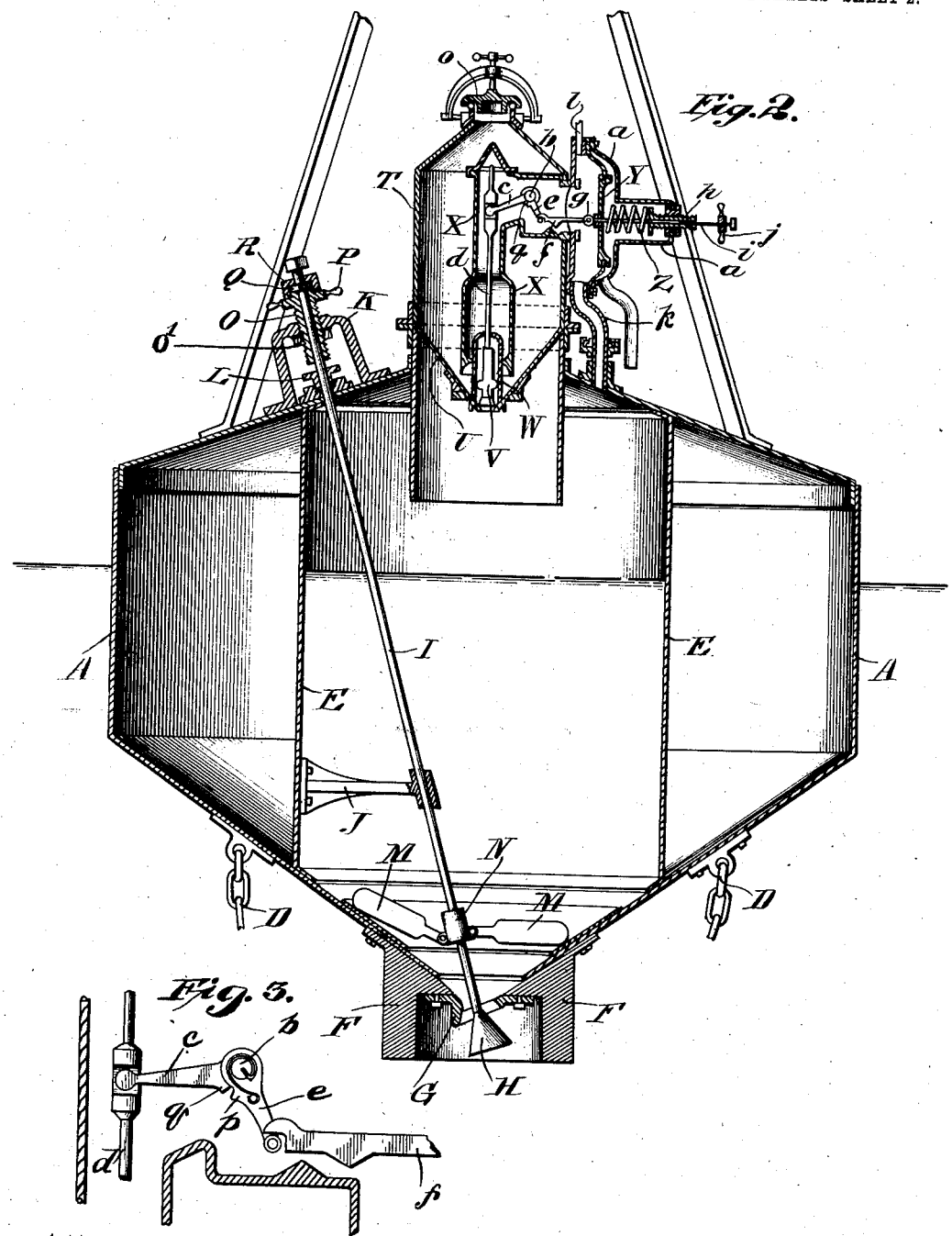

NELSON GOODYEAR, OF NEW YORK, N. Y., ASSIGNOR TO BROOKS H. WELLS, OF NEW YORK, N. Y.

GAS-BUOY.

1,088,146. Specification of Letters Patent. Patented Feb. 24, 1914.

Application filed August 8, 1906, Serial No. 329,637. Renewed May 21, 1907. Serial No. 374,924.

*To all whom it may concern:*

Be it known that I, NELSON GOODYEAR, a citizen of the United States, and resident of the borough of Manhattan, city, county, and State of New York, have invented certain new and useful Improvements in Gas-Buoys, of which the following is a specification, accompanied by drawings.

This invention relates to buoys which are lighted by gas, as for instance acetylene gas, which is produced by a generator forming part of the buoy.

The objects of the invention are to improve upon the construction and operation of such buoys.

Another object is to secure efficient mechanical means certain in their operation for controlling the generation of gas.

Further objects of the invention will hereinafter appear and to these ends the invention consists of a gas buoy for carrying out the above objects embodying the features of construction, combinations of elements, and arrangement of parts having the general mode of operation substantially as hereinafter fully described and claimed in this specification and shown in the accompanying drawings, in which,—

Figure 1 is a side elevation of a buoy embodying the invention; Fig. 2 is a vertical sectional elevation enlarged taken through the float and carbid feeding mechanism; and Fig. 3 is an enlarged detail view of a part of the carbid feeding mechanism.

Referring to the drawings A represents the body or float of the buoy and B is a suitable lantern supported in any suitable manner from the float as by means of the frame work C. The float is adapted to be anchored as by means of the chain or chains D, and within the float is a generating chamber E in this instance shown of cylindrical form and having an opening in its bottom for the ingress and egress of water. On the bottom of the float is preferably arranged a weighted cap F having a valve seat G, with which coöperates a valve H carried by the valve rod I, and means are provided for controlling said valve. As shown, the valve rod I is supported by a bracket J extending from the side of the generating chamber and by another bracket K mounted on the outside of the float. The point at which the rod I passes through the top of the float is sealed by a stuffing box L. Means are provided for adjusting the valve H on its seat G and also for rotating the rod I in order to move the stirring blades M, which, as shown, are pivoted to a sleeve N on the rod I. The rod I is provided with a sleeve O outwardly screw-threaded and coöperating with screw threads in the bracket K and lock nut O'. Handles P are provided for rotating the sleeve O, and the rod I is provided with a stop or collar Q seated between the sleeve O and a cap R, which cap is suitably connected with the sleeve O. The outer end of the rod I is provided with a nut or squared portion to take a wrench or spanner and enable the rod I to be rotated to agitate the blades M. By turning the sleeve O by means of the handles P it will be seen that the rod I will be moved longitudinally in the bracket K to open or close the valve H.

Suitable means are provided for automatically feeding the carbid to the water in the generator tank E. In this instance a carbid feeding mechanism is inclosed in the carbid hopper T, which has a conical bottom U having an opening controlled by the valve V. In this instance the valve is provided with a stop W, which is raised after the valve is raised, and which closes before the valve closes. The valve V and stop W operate within a protective shield or casing X which also protects the valve operating mechanism. As shown, and in accordance with this invention the valve V is controlled by means of an expansible and collapsible diaphragm Y opposed by a suitable spring Z, the diaphragm and spring and related parts being suitably inclosed in the casing a. A rock shaft b is pivoted in the casing X and is provided with an arm c fast thereon engaging the valve rod d connected to the valve V. Another arm e is loose on the rock shaft b and bears against a horizontal rod f provided with a hinge joint g securing it to the diaphragm Y. The rod i forming a continuation of the rod f is secured to and passes through the diaphragm and through a sealing sleeve h in the casing a. The outer end of the rod i is screw-threaded and provided with a nut j by means of which the throw of the diaphragm Y is adjusted to prevent automatic feeding of carbid when desired. The carbid hopper T is provided with a suitable cap or cover o suitably held in position. In this instance a gas pipe k is shown affording communication between the gas generating chamber E and the diaphragm chamber. This same pipe $k$ and chamber are utilized to permit the passage of the gas to the lantern B as by means of the gas pipe $l$.

In the operation of the apparatus water is permitted to rise in the generating chamber E and then the valve H is closed by manipulating the handles P. In order to start the generation of gas after charging, the nut $j$ is screwed outward, releasing rod $i$ and allowing the spring Z or the hand of the operator or both to actuate the feeding mechanism to cause feeding, thereby forcing the stop $p$ on the arm $e$ loose on the rock shaft $b$ against the stop $q$ on the arm $c$ fast on said rock shaft, thereby raising the arm $c$ and rocking the shaft, and raising the valve rod $d$ and valve V together with the shield W. Some carbid is permitted to drop into the water and some gas is generated and the operation of the apparatus proceeds automatically thereafter. The diaphragm Y is so adjusted that when the gas pressure falls below a certain amount the spring Z forces the diaphragm Y inward against the stop $g$ on the rod $f$, thereby raising the outer end of the arm $c$ and opening the carbid valve. When the pressure resumes its normal degree again the diaphragm Y is forced outward against the pressure of the spring Z and the carbid valve is closed. In this way a steady generation of gas is provided.

By the terms "gas buoy", "body" and "float" I do not, of course, mean to exclude vessels or boats of various forms not strictly buoys wherewith the combination claimed may be useful.

It will be seen in Figs. 3 and 2 that if the buoy runs out of carbid the movement of the rod $f$ toward the left beyond its usual working range will cause it to ride up on the adjacent portion of the casing shown and thereby disconnect itself from the arm $e$, allowing the valve to fall and close, ready for recharging. It will also be seen that the buoy is well adapted for shallow waters where it may sometimes partly rest upon the bottom at low tide, for the water level within it can be maintained by having the valve H tightly closed. Manifestly, also, in other situations the valve may be used slightly open to allow the water in the chamber gradually to change and the sediment automatically wash out by the wave action, or, in calm weather, by the action of varying gas pressure.

Obviously some features of this invention may be used without others and the invention may be embodied in widely varying forms.

Therefore, without limiting the invention to the devices shown and described, and without enumerating equivalents, I claim and desire to obtain by Letters Patent the following:—

1. In a gas buoy the combination with the body or float, of a water chamber therein having an aperture at its lower end, a carbid hopper, carbid feeding mechanism controlling the feeding of carbid to the water provided with an expansible and collapsible diaphragm for controlling said carbid feeding mechanism, and means for opening and closing the aperture at the lower end of the water chamber to control the ingress and egress of water for the generating chamber.

2. In a gas buoy, the combination with the body or float, of a carbid hopper, carbid feeding mechanism provided with a diaphragm controlling the same, a gas generating chamber carried by the float having an opening in the bottom thereof, whereby the water for generating purposes may be admitted to the chamber, the resistance to pressure afforded by the diaphragm substantially balancing the normal gas pressure in the gas chamber.

3. In a gas buoy, the combination of a body or float, a generating chamber carried thereby having an opening in the bottom thereof, a valve for said opening, means for opening and closing said valve, a carbid hopper, a carbid valve, and valve mechanism provided with an expansible and collapsible diaphragm for controlling said carbid valve.

4. In a gas buoy, the combination of a body or float, a gas generating chamber carried thereby having an opening in its bottom for the entrance of the surrounding water and egress of residuum, a valve for said opening whereby the water may be trapped in the chamber, and carbid feeding mechanism provided with a diaphragm responsive to the gas pressure for controlling said feeding mechanism, the resistance to pressure afforded by the diaphragm substantially balancing the normal gas pressure in the gas chamber.

5. In a gas buoy the combination of a body or float, carbid feeding mechanism, a gas generating chamber having an opening in its bottom for admitting and expelling sea water, and a valve and valve operating connections for the said opening whereby water may be trapped and a constant working level maintained unaffected by the variations of gas pressure.

6. In a gas buoy, the combination of the water chamber having an opening for the ingress and egress of the water, a valve therefor, a rod for actuating the said valve and stirring blades also actuated by the said rod.

7. In a gas buoy, the combination of the water chamber having an opening for the ingress and egress of the water, a valve therefor, a rod for actuating the said valve and stirring blades also actuated by the said rod, the said rod having means for adjusting it longitudinally and means for rotating it.

8. In a gas buoy, the combination of a body or float, a gas generating chamber therein having an opening in its bottom for water, a valve and valve operating connections for said opening whereby water may be trapped and a constant working level maintained unaffected by the variations of gas pressure, and a carbid hopper, and a carbid valve therefor provided with carbid feeding mechanism and an expansible diaphragm subject to the pressure of the gas for controlling the operation of said feeding mechanism.

9. The combination of a body or float, a generating chamber having an opening or passageway to the water around the body or float, said chamber being at least partly below the lever of said water when floating, gas generating mechanism controlled by the pressure of gas generated independently of the movement of water within said chamber, and means independent of said generating mechanism for controlling the said opening.

10. The combination of a body or float, a generating chamber having an opening or passageway to the water around the body or float, said chamber being at least partly below the level of said water when floating, gas generating mechanism controlled by the pressure of gas generated independently of the movement of water within said chamber and comprising means for feeding a stream of one of the gas-making materials and interrupting such stream.

11. The combination of a body or float, a generating chamber having an opening or passageway to the water around the body or float, said chamber being at least partially below the level of the said water when floating, whereby water is admitted to the chamber under pressure through the said opening, gas generating mechanism for automatically feeding a gas generating material to water, including manually operable means for actuating the said mechanism adapted to generate gas at will depressing the water in the said chamber and causing egress through the said opening.

In testimony whereof I have signed this specification in the presence of two subscribing witnesses.

NELSON GOODYEAR.

Witnesses:
E. VAN ZANDT,
A. L. O'BRIEN.